(12) United States Patent
Nakamura et al.

(10) Patent No.: US 8,110,244 B2
(45) Date of Patent: Feb. 7, 2012

(54) MANUFACTURING METHOD AND APPARATUS OF ORGANIC RESIN COATED METAL SHEET

(75) Inventors: Takuji Nakamura, Kudamatsu (JP); Hiroshi Inazawa, Kudamatsu (JP); Norimasa Maida, Kudamatsu (JP); Yasuhiro Matsubara, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 587 days.

(21) Appl. No.: 12/306,025

(22) PCT Filed: Jun. 18, 2007

(86) PCT No.: PCT/JP2007/062206
§ 371 (c)(1),
(2), (4) Date: Dec. 22, 2008

(87) PCT Pub. No.: WO2007/148641
PCT Pub. Date: Dec. 27, 2007

(65) Prior Publication Data
US 2009/0283200 A1 Nov. 19, 2009

(30) Foreign Application Priority Data
Jun. 20, 2006 (JP) .................................. 2006-169597

(51) Int. Cl.
*B32B 37/06* (2006.01)
*B05D 3/06* (2006.01)
*B05D 3/12* (2006.01)

(52) U.S. Cl. .................. 427/8; 118/35; 118/37; 118/40; 118/641; 118/712; 156/62.2; 156/244.27; 156/538; 156/555; 427/9; 427/299; 427/314; 427/359; 427/421.1

(58) Field of Classification Search .................. 118/35, 118/37, 39, 40, 641, 663, 665, 666, 667, 118/676, 677, 688, 712; 156/64, 349, 350, 357, 378, 379.9, 499, 580, 583.1, 583.4; 427/8, 9, 421.1
See application file for complete search history.

(56) References Cited

U.S. PATENT DOCUMENTS
2002/0166637 A1* 11/2002 Kobayashi et al. ........... 156/555

FOREIGN PATENT DOCUMENTS
| JP | 61-127331 A | 6/1986 |
|---|---|---|
| JP | 07-080935 A | 3/1995 |
| JP | 07-080936 A | 3/1995 |
| JP | 10-303085 A | 11/1998 |
| JP | 2002-127099 A | 5/2002 |
| WO | 2004041517 A1 | 5/2004 |

* cited by examiner

*Primary Examiner* — Michael Cleveland
*Assistant Examiner* — Alexander Weddle
(74) *Attorney, Agent, or Firm* — Browdy and Neimark, PLLC

(57) ABSTRACT

A manufacturing method and apparatus of an organic resin coated metal sheet is provided. Temperatures of edge portions of the metal sheet and a temperature of an approximately central portion of the metal sheet are respectively measured using a metal-sheet temperature measuring device arranged directly upstream of lamination rolls. Respectively measured temperature values are inputted to a heating temperature controller, and output values calculated by the heating temperature controllers are inputted to a metal sheet center portion heater and the metal sheet center portion heater, respectively, to control the heating of a widthwise approximately center portion and edge portion, respectively, to a first and second temperature, respectively, the second temperature being higher than the first. A resin film is extruded to pre-rolls and is sandwiched and pressure-bonding to the metal sheet between a pair of lamination rolls. Resin portions projecting from both edge portions are then removed.

6 Claims, 2 Drawing Sheets

MANUFACTURING METHOD AND APPARATUS OF ORGANIC RESIN COATED METAL SHEET

TECHNICAL FIELD

The present invention relates to a manufacturing method and apparatus of an organic resin coated metal sheet which can cut and remove ear portions which are formed at the time of forming an organic resin coated metal sheet by extruding and applying an organic resin to a surface of a metal sheet by coating using a T-die.

BACKGROUND ART

Conventionally, in manufacturing an organic resin coated metal sheet which forms a resin film on a metal sheet by extruding an organic resin to a surface of the metal sheet using a T-die, with respect to the treatment applied to both edge portions (ear portions) of a resin film whose thicknesses are increased due to a neck-in phenomenon generated after the extrusion of the resin from the T-die, there has been known a technique in which the resin film forms the ear portions on both sides of the organic resin coated metal sheet and, thereafter, the ear portions are trimmed together with a metal sheet having an area of necessary minimum. Alternatively, a resin film is applied to a metal sheet by coating while sufficiently increasing a width of the metal sheet so as to prevent the formation of ear portions and, thereafter, the resin film is trimmed together with both edge portions of the metal sheet having a width corresponding to the expansion of the width of the metal sheet.

However, the former method has a drawback that the ear portion falls in a path before arriving at a trimming step or is entangled in and is adhered to a base material, while the latter method has a drawback that portions of the resin film having a large thickness cannot be used and hence, the use efficiency of the metal sheet is decreased.

Further, both methods have a drawback that the trimmed resin film is integrally formed with the metal sheet and hence, the trimmed resin film cannot be used for recycling.

In view of the above, to overcome the above-mentioned drawbacks, there has been also proposed a method which recycles ear portions of a resin film after trimming as disclosed in the following patent document 1.

According to this method, in extruding a molten resin to a metal sheet from a T-die and applying a resin film to a metal sheet by sandwiching the molten resin and both surfaces of the metal sheet between a pair of laminate rollers, ear portions which project from the metal sheet in the widthwise direction of the metal sheet are clamped, torn and removed by a grip means such as endless guide belts before the resin is cooled.
Patent Document 1

DISCLOSURE OF INVENTION

Problems that the Invention is to Solve

However, the method described in patent document 1 has drawbacks on practical use including the necessity of the grip means such as the endless guide belts, the easy adhesion of the cut resin ears to the belt and pushing up of a manufacturing cost.

Accordingly, it is an object of the present invention to provide a manufacturing method and apparatus of an organic resin coated metal sheet which can manufacture an organic resin coated metal sheet without pushing up an industrial manufacturing cost by avoiding the addition of particular facilities for cutting and removing ear portions.

Accordingly, it is an object of the present invention to provide a manufacturing method and apparatus of an organic resin coated metal sheet which can surely remove ear portions projecting from both edges of a metal sheet.

Further, it is another object of the present invention to provide a manufacturing method and apparatus of an organic resin coated metal sheet which can surely remove ear portions projecting from both edges of a metal sheet without damaging resin or a metal sheet.

Means for Solving the Task (1) According to a first aspect of the present invention, there is provided a manufacturing method of an organic-resin coated metal sheet by directly extruding an organic resin melted by heating from a die lip of a T-die in a film shape onto a metal sheet thus applying an organic resin film to the metal sheet by coating, wherein the manufacturing method includes the steps of: continuously feeding a long strip metal sheet using a metal-sheet supply means; measuring temperatures of edge portions of the metal sheet and a temperature of an approximately central portion of the metal sheet using a metal-sheet temperature measuring means arranged directly upstream of lamination rolls; inputting temperature values respectively measured by the metal-sheet temperature measuring means to a heating temperature control means; feeding an output value calculated by the heating temperature control means to a metal sheet center portion heating means arranged directly upstream of the T-die; heating a widthwise approximately center portion of the metal sheet to a first temperature by the metal sheet center portion heating means based on the output value; feeding the output value calculated by the heating temperature control means to a metal sheet edge portion heating means arranged directly upstream of the T-die; heating widthwise edge portions of the metal sheet to a second temperature higher than the first temperature by the metal sheet edge portion heating means based on the output value; applying a resin film extruded from the T-die such that the resin film projects from both widthwise edge portions of the metal sheet by sandwiching and pressure-bonding the metal sheet and the resin film between a pair of lamination rolls; and removing resin portions in a semi-molten state and projecting from both edge portions of the metal sheet by press cutting.

(2) In the above-mentioned manufacturing method of an organic-resin coated metal sheet (1), the second temperature for heating both widthwise edge portions of the metal sheet may fall within a temperature range of a highest melting temperature of the organic resin to be coated+(10 to 50° C.).

(3) In the above-mentioned manufacturing method of an organic-resin coated metal sheet (1) or (2), the heating temperature control means compares the first temperature and the second temperature inputted to the heating temperature control means, determines whether or not the second temperature is equal to or higher than the first temperature, and determines whether or not the inputted second temperature falls within a temperature range of a melting temperature of the resin inputted to the heating temperature control means+(10 to 50° C.).

(4) In any one of the above-mentioned manufacturing methods of an organic-resin coated metal sheet (1) to (3), a monitor sensor for monitoring whether or not the resin portions to be removed are removed by press cutting is arranged directly downstream of the lamination rolls, the monitor sensor transmits a signal to a lamination roll pressing force control device when the monitor sensor cannot detect the removed resin portion allows the lamination roll pressing force control device to determine that the resin portion is not cut by a press, the lamination roll pressing force control device transmits a signal for increasing a pressing force of the lamination roll to a lamination roll press device, and the lamination roll press device presses either one or both of right and left end portions of one of the lamination rolls in the lamination direction.

(5) According to a second aspect of the present invention, there is provided a manufacturing apparatus of an organic-resin coated metal sheet by directly extruding an organic resin melted by heating from a die lip of a T-die in a film shape onto a metal sheet thus applying an organic resin film to the metal sheet by coating, wherein the manufacturing apparatus includes: a metal sheet supply means which continuously feeds a long strip metal sheet; a metal sheet temperature measuring means which is arranged directly upstream of lamination rolls and measures temperatures of edge portions of the metal sheet and a temperature of an approximately central portion of the metal sheet; a heating temperature control means which receives inputting of temperature values measured by the metal-sheet temperature measuring means, calculates heating temperatures for heating the edge portions of the metal sheet and the approximately central portion of the metal sheet, and outputs a result value of the heating temperatures; a metal sheet center portion heating means which is arranged directly upstream of the T-die and heats a widthwise approximately center portion of the metal sheet to a first temperature based on the output value from the heating temperature control means; a metal sheet edge portion heating means which is arranged directly upstream of the T-die and heats both widthwise edge portions of the metal sheet to a second temperature higher than the first temperature based on the output value from the heating temperature control means; a pair of lamination rolls which applies a resin film extruded from the T-die to the metal sheet by sandwiching and pressure-bonding the metal sheet and the resin film therebetween and press-cuts resin portions in a semi-molten state projecting from both edge portions of the metal sheet; and a removal means which removes the press-cut resin portions.

(6) In the above-mentioned manufacturing apparatus of an organic-resin coated metal sheet (5), a monitor sensor for monitoring whether or not the resin portions to be removed are removed by press cutting is arranged directly downstream of the lamination rolls, the monitor sensor transmits a signal to a lamination roll pressing force control device when the monitor sensor cannot detect the removed resin portion, the lamination roll pressing force control device transmits a signal for increasing a pressing force of the lamination roll to a lamination roll press device, and the lamination roll press device presses either one or both of right and left end portions of one of the lamination rolls in the lamination direction.

Advantageous Effect of the Present Invention

According to the present invention, only both edge portions of the metal sheet are heated at the highest melting temperature of the resin to be applied to the metal sheet by coating+ (10 to 50° C.) and hence, it is possible to trim the resin portions which project from both edge portions of the metal sheet easily and in a stable manner while preventing the deterioration of the resin other than the resin applied to both edge portions of the metal sheet.

Further, the edge portions of the metal sheet which are heated at the high temperature are locally heated and hence, only such heated portions can be removed by trimming later whereby it is possible to acquire the organic resin coated metal sheet having the stable characteristic in the widthwise direction.

BEST MODE FOR CARRYING OUT THE INVENTION

In a manufacturing apparatus of an organic resin coated metal sheet of the present invention, a pair of lamination rolls is arranged on both surface sides of a metal sheet which travels in the vertical direction in a state that the lamination rolls sandwich the metal sheet. The lamination roll is formed by mounting a cylindrical resilient body made of silicon rubber or the like on a surface of an elongated roll body, and the metal sheet is sandwiched between the pair of lamination rolls in a resiliently pressed state by way of the resilient body.

On the other hand, above (or upstream of) the pair of lamination rolls, a pair of T-dies which respectively extrudes a molten resin is arranged. The molten resin is extruded to nip portions defined between oppositely-facing surfaces of the lamination rolls and the metal sheet from the T-dies and, thereafter, the molten resin is pressure-bonded to the metal sheet by the pair of lamination rolls thus manufacturing a resin coated metal sheet which have both surfaces thereof coated with the resin.

Here, by setting a die-lip width of the T-dies such that a width of a film of the molten resin extruded from the T-dies becomes larger than a width of the metal sheet, both resin films overlap the metal sheet in a state that both left and right edge portions of the molten resin project from both edge portions of the metal sheet.

Hereinafter, one embodiment of the manufacturing apparatus of an organic resin coated metal sheet of the present invention is explained in further detail in conjunction with attached drawings.

FIG. 1 is a schematic side view for explaining a manufacturing method of an organic resin coated metal sheet according to the embodiment of the present invention.

FIG. 2 is a schematic front view for explaining the manufacturing method of an organic resin coated metal sheet according to the embodiment of the present invention.

As shown in FIG. 1 and FIG. 2, the manufacturing apparatus of an organic resin coated metal sheet according to this embodiment is an apparatus which directly applies a heated molten organic resin extruded from a die-lip of a T-die 8 to a metal sheet 1 by coating in a film shape.

The manufacturing apparatus includes a metal sheet supply means 13 which continuously feeds the long strip metal sheet 1; a metal sheet temperature measuring means 7 (7a, 7b, 7c) which is arranged directly upstream of lamination rolls 10 and measures temperatures of both edge portions 1a, 1b of the metal sheet 1 and a temperature of an approximately central portion 1c of the metal sheet 1; a heating temperature control means 14 which receives inputting of temperature values measured by the metal-sheet temperature measuring means 7, calculates heating temperatures for heating both edge portions 1a, 1b of the metal sheet 1 and the approximately central portion 1c of the metal sheet 1, and outputs a result value of the heating temperatures; a metal sheet center portion heating means 3 which is arranged directly upstream of the T-die 8 and heats a widthwise approximately center portion 1c of the metal sheet 1 to a first temperature based on the output value from the heating temperature control means 14; a metal sheet edge portion heating means 5 which is arranged directly upstream of the T-die 8 and heats both widthwise edge portions 1a, 1b of the metal sheet 1 to a second temperature higher than the first temperature based on the output value from the heating temperature control means 14; and a pair of lamination rolls 10 which applies a resin film 2 extruded from the T-die 8 to the metal sheet 1 by coating by sandwiching and pressure-bonding the metal sheet 1 and the resin film 2 therebetween and press-cuts and removes resin portions 2a in a semi-molten state projecting from both widthwise edge portions of the metal sheet 1.

In the apparatus of this embodiment, a coil wound in a roll shape is unwound by a metal sheet supply means 13 such as a coil unwinding roll, the metal sheet 1 is continuously paid off in a long strip state, and the metal sheet 1 is made to pass between the pair of lamination rolls 10 while extruding the resin film 2 in a molten state toward both surfaces of the traveling metal sheet 1 from the T-die 8 thus applying the resin film 2 to both surfaces of the metal sheet 1.

Further, in applying the resin film 2 to the surface of the metal sheet 1, the long strip metal sheet 1 is continuously unwound from the metal sheet supply means 13 and is made to travel. Then, the metal sheet 1 is brought into contact with a jacket roll 4 which is arranged in the inside of the metal sheet center portion heating means 3 thus preliminarily heating a widthwise center portion of the metal sheet to a first temperature.

Further, both widthwise edge portions of the metal sheet are, thereafter, respectively heated to a second temperature higher than the first temperature by metal sheet edge portion heating means 5, 5 arranged at both left and right edges of the traveling metal sheet.

In this manner, the control of the temperature of the metal sheet such that the temperature differs among portions of the metal sheet in the widthwise direction is performed as follows.

The respective temperatures of both left and right edge portions 1a, 1b of the metal sheet and the temperature of an approximately center portion 1c of the metal sheet are measured using a metal sheet temperature measuring means 7 arranged directly upstream of the lamination rolls such as a contact-type thermocouple or a non-contact-type radiation thermometer (the respective portions of the metal sheet being respectively measured by metal sheet temperature measuring means 7a, 7b, 7c).

Respective temperature values measured by the metal sheet temperature measuring means 7a, 7b, 7c are inputted to a heating temperature control means 14.

The heating temperature control means 14 calculates the temperature difference between the measured temperature values and preset initial values, and outputs shortage amounts as output values.

The output value is transmitted to the metal sheet center portion heating means 3 so as to heat the widthwise approximately center portion 1c of the metal sheet to the first temperature.

The output values are transmitted to the metal sheet edge portion heating means 5, 5 so as to heat both widthwise edge portions 1a, 1b of the metal sheet to the second temperature higher than the first temperature.

Here, the second temperature falls within a temperature range of a highest melting temperature of an organic resin to be applied to the metal sheet by coating+(10 to 50° C.).

It is more preferable to set the second temperature such that the second temperature falls within a temperature range of the highest melting temperature+(30 to 50° C.).

When a multi-layered organic resin having two layers or more is applied to the metal sheet by coating, it is preferable to set the heating temperature of the metal sheet to a melting temperature of an organic resin having a highest melting temperature out of the multi-layered organic resins+(10 to 50° C.).

It is more preferable to set the heating temperature of the metal sheet to a value which falls within a temperature range of the melting temperature of the organic resin having the highest melting temperature+(30 to 50° C.).

Such temperature ranges are set due to following reasons.

That is, when the temperature of the metal sheet is lower than the highest melting temperature of the organic resin to be applied to the metal sheet by coating+10° C., the resin films which are applied to both left and right edges of the metal sheet by coating are partially solidified. Accordingly, in removing the resin films by press-cutting using the lamination rolls, there exists possibility that the resin films are torn into pieces thus generating cracks, and these cracks propagate to the resin film forming a product portion thus manufacturing a defective product.

On the other hand, when the temperature of the metal sheet exceeds the highest melting temperature of the organic resin to be applied to the metal sheet by coating+50° C., the resin film cannot be completely cut by press-cutting using the lamination rolls and hence, edge portions of the resin film remain in a form of threads.

These threads are again adhered to the edge portions of the metal sheet thus giving rise to possibility that the edge portion of the metal sheet cannot be press-cut by the lamination rolls.

Here, it is preferable that a width of the heating regions 6 heated by the metal sheet edge portion heating means 5, 5 is as small as possible. This is because there may be case that the property of the metal sheet is changed due to heating and it is necessary to remove such portions by trimming the metal sheet after applying the organic resin to the metal sheet by coating. It is preferable to set the width of the heating regions to a value which falls within 10 mm from both edge portions of the metal sheet in the widthwise direction.

As the metal sheet edge portion heating means 5, 5 which can perform local heating, it is preferable to use a high frequency induction heating device which can heat the metal sheet in a non-contact manner.

In this embodiment, the temperature of the widthwise approximately center portion 1c of the metal sheet and the temperatures of both widthwise edge portions 1a, 1b of the metal sheet are preliminarily controlled by the heating temperature control means 14 as follows.

First of all, a kind of the traveling metal sheet (for example, a tin plate or an aluminum alloy sheet) is inputted to the heating temperature control means 14.

Heating temperatures corresponding to kinds of sheets are stored in the heating temperature control means 14 as a database, and a signal corresponding to the inputted kind of metal sheet is transmitted to the metal sheet center portion heating means 3 so as to perform a heating control of the widthwise approximately center portion 1c of the metal sheet such that the widthwise approximately center portion 1c assumes the first temperature.

Further, corresponding to the kind of the traveling metal sheet, the temperatures (second temperature) of both widthwise edge portions 1a, 1b are inputted to the heating temperature control means 14. The heating temperature control means 14 compares the temperatures of both widthwise edge portions 1a, 1b with the precedingly inputted first temperature, and determines whether or not the inputted second temperature is equal to or more than the precedingly inputted first temperature.

Then, in the next step, it is determined whether or not the inputted second temperature falls within a range of a melting temperature of resin+(10 to 50° C.) which is precedingly inputted to the heating temperature control means 14.

In this manner, the temperature of the widthwise approximately center portion 1*c* of the metal sheet and the temperatures of both widthwise edge portions 1*a*, 1*b* of the metal sheet are automatically controlled.

The metal sheet 1 which is heated by the metal sheet center portion heating means 3 and the metal sheet edge portion heating means 5, 5 is fed downwardly from the T-dies 8, 8 which melt an organic resin to be applied to the metal sheet 1 by heating and eject the molten organic resin. The resin films 2 which are in a molten state by heating using a resin heating and melting means such as an extruder not shown in the drawing is continuously extruded onto the metal sheet 1 from the die lips 8*a*, 8*a* of the T-dies 8, 8 while performing neck-in of the resin films 2 such that the resin films 2 project from a width of the metal sheet 1, that is, from both left and right edges of the metal sheet 1. Then, the metal sheet 1 and the resin films 2 are sandwiched by the pair of lamination rolls 10, 10 thus applying the resin films 2 to the metal sheet 1 by pressure bonding.

As shown in FIG. 1 and FIG. 2, the resin films 2 in a molten state extruded from the die lips 8*a* of the T-dies 8 may be once dropped on pre-rolls 9, 9 which are arranged directly upstream of the lamination rolls 10 and, thereafter, may be pressure-bonded to the metal sheet 1 by the lamination rolls 10. In this manner, by dropping the resin films 2 on the pre-rolls 9, 9 once, it is possible to prevent excessive neck-in of the resin films 2 thus preliminarily making the flatness and the thickness of the resin films 2 uniform.

The resin portions 2*a* of the resin films 2 which are in a semi-molten state and projecting from the metal sheet 1 are sandwiched between the lamination rolls 10 together with the metal sheet 1, edge portions of the metal sheet 1 are press-cut by the lamination rolls 10 which constitute a pair of cutting blades, and the edge portions are removed as removed resin portions (ears) 12 using a removal means 15 such as a vacuum suction apparatus or a winder.

Here, by providing a monitor sensor 16 which monitors whether or not the removed resin portions 12 are removed by press-cutting directly downstream of the lamination rolls 10, it is always possible to detect whether or not the removed resin portions 12 are normally removed by press-cutting.

For example, a non-contact-type monitor sensor such as a CCD camera or an infrared camera or a contact sensor may be used as the above-mentioned monitor sensor 16.

Then, when the monitor sensor 16 cannot detect the removed resin portions 12, a signal indicative of this monitoring result is transmitted to a lamination roll pressing force control device 17. The lamination roll pressing force control device 17 determines that press-cutting of the above-mentioned resin portions 2*a* is not performed in response to the signal, and transmits a signal to a lamination roll press device 18 so as to increase a pressing force of the lamination rolls 10. In response to the signal, the lamination roll press device 18 presses either left or right roll end portion or both of roll end portions of one of lamination rolls 10 in the lamination direction.

Next, materials used in the present invention are explained in order.

[Metal Sheet]

As a metal sheet used for manufacturing the organic resin coated metal sheet, it is possible to use various surface treatment steel sheets, an aluminum sheet, an aluminum alloy sheet, a stainless steel sheet, a steel sheet, a copper alloy sheet or the like. Particularly, with respect to the aluminum sheet and the aluminum alloy sheet, when these sheets are heated to a temperature equal to or above a melting temperature of the organic resin, the properties that the organic resin coated metal sheet possesses as a coated substrate are changed due to averaging and hence, it is possible to manufacture the organic resin coated metal sheet having excellent properties by applying the manufacturing method of the present invention to the organic resin coated metal sheet.

As the surface treatment steel sheet, it is possible to use a tin plate, an electrolytic chromatic steel sheet, an electrogalvanized steel sheet, an electrogalvanized alloy steel sheet, a composite electrogalvanized-cobalt-molybdenum alloy steel sheet, a nickel plated steel sheet, a copper plated steel sheet, a hot-dip electrogalvanized steel sheet, a hot-dip zinc-aluminum alloy plated steel sheet, a hot-dip zinc-aluminum-magnesium alloy plated steel sheet, a hot-dip zinc-nickel alloy plated steel sheet, an aluminum plated steel sheet or the like.

An example of the tin plate is a tin plate having a tin plate quantity of 0.6 to 11.2 $g/m^2$.

It is preferable to apply chromic acid treatment or chromic acid/phosphoric acid treatment to a surface of the tin plated steel sheet such that a quantity of chromium is 1 to 30 $mg/m^2$ in terms of metal chromium.

Particularly, when the tin plate coated with tin which is metal having a low melting point is used as the metal sheet, it is important to apply the organic resin to the metal sheet by coating such that the organic resin is not melted by heating at a high temperature for preventing reflow of tin. In this case, the change of physical properties of the metal sheet and the organic resin can be reduced.

Here, in using the tin plate as the metal sheet, the reflow treatment may be either applied or not applied to the metal sheet. Although the chemical conversion treatment after Sn plating may be applied or omitted, when such chemical conversion treatment is applied to the metal sheet, known treatment can be applied to the metal sheet. For example, chemical conversion treatment (including electrolytic treatment, immersion treatment), phosphate treatment, Zr treatment or the like can be applied to the metal sheet.

Further, as the metal sheet, a light metal sheet such as an aluminum alloy sheet can be also used besides a pure aluminum sheet. The aluminum alloy sheet which exhibits excellent corrosion resistance and excellent formability essentially consists of 0.2 to 1.5% by weight of Mn, 0.8 to 5% by weight of Mg, 0.25 to 0.3% by weight of Zn, 0.16 to 0.26% by weight of Cu, and a balance made of Al. It is also desirable that the chromic acid treatment or chromic acid/phosphoric acid treatment is applied to the metal sheet such that a quantity of chromium is 20 to 300 $mg/m^2$ in terms of metal chromium.

Further, when the aluminum sheet or the aluminum alloy sheet which possesses the relatively low melting point is used as the metal sheet, it is possible to prevent the deformation of the metal sheet by controlling a heating temperature of the metal sheet.

It is preferable to set a thickness of the metal sheet to a value which falls within a range from 0.10 to 0.50 mm in general. Particularly, it is preferable to set the thickness of the metal sheet to a value which falls within a range from 0.10 to 0.30 mm when the surface treatment steel sheet is used as the metal sheet, and it is preferable to set the thickness of the metal sheet to a value which falls within a range from 0.15 to 0.40 mm when the light metal sheet is used as the metal sheet. It is needless to say that the thickness of the metal sheet differs depending on a kind of metal, the application and a size of a member to be coated.

An adhesion primer layer may be formed on a metal material. The primer is required to exhibit excellent adhesiveness to both of the metal material and the organic resin to be applied to the metal material by coating. As an example of primer paint, a phenol-epoxy paint which is made of a resol-type phenol aldehyde resin induced from various phenol groups and formaldehyde and a bisphenol-type epoxy resin can be used. Particularly, it is preferable to use a paint which contains a phenol resin and an epoxy resin at a weight ratio of 50:50 to 5:95. It is further preferable to use a paint which contains a phenol resin and an epoxy resin at a weight ratio of 40:60 to 10:90. It is preferable to set a thickness of the adhesive primary layer to approximately 0.3 to 5 µm from a viewpoint of enhancing adhesiveness or the like.

[Resin]

Although it is preferable to use a thermoplastic resin as the organic resin to be applied to the metal sheet by coating, any thermoplastic resin can be used provided that the thermoplastic resin can be extruded and possesses film formability. For example, as the thermoplastic resin, it is possible to use any resin selected from a group consisting of polyolefin such as low-density polyethylene; high-density polyethylene; polypropylene, poly-1-butene, poly-4-methyl-1-pentene, random or block copolymer of α-olefin such as ethylene, pyropyrene, 1-butene, 4-methyl-1-pentene; ethylene•vinyl compound copolymer such as ethylene•vinyl acetate copolymer, ethylene•vinyl alcohol copolymer or ethylene•vinyl chloride copolymer; styrene-based resin such as polystyrene, acrylonitrile•styrene copolymer, ABS or α-methylstyrene•styrene copolymer; polyvinyl compound such as polyvinylchloride, polyvinylidene chloride, polyvinylchloride•polyvinylidene chloride copolymer, polymethyl acrylate or polymethyl methacrylate; polyamide such as nylon 6, nylon 6-6, nylon 6-10, nylon 11 or nylon 12; thermoplastic polyester such as polyethylene terephthalate or polybutylene terephthalate; polycarbonate, polyphenylene oxide or mixture thereof.

As the particularly preferable thermoplastic resin from a viewpoint of film property, formability, corrosion resistance and the like, thermoplastic polyester, copolyester or a blend of these materials can be named. Among these materials, polyester which contains ethylene terephthalate unit as a main component can be preferably used.

Although polyethylene terephthalate can be used as the material polyester, since it is desirable to lower the highest crystallization temperature from a viewpoint of enhancing impact resistance and formability of the laminate, it is preferable to introduce a copolymer ester unit other than ethylene terephthalate in polyester.

It is particularly preferable to use copolyester which contains ethylene terephthalate unit as a main component and a small quantity of other ester unit and has a melting point of 210 to 252° C. Here, homopolyethylene terephthalate which has a melting point of 255 to 265° C. in general can be used.

In general, it is preferable to use copolyester in which 70 or more molecular %, and more particularly, 75 molecular % of dibasic acid component is constituted of a terephthalic acid component, 70 or more molecular %, and more particularly, 75 molecular % of diol component is constituted of ethylene glycol, and 1 to 30 molecular %, and more particularly, 5 to 25 molecular % of dibasic acid component and/or diol component is constituted of a dibasic acid component other than terephthalic acid and/or dibasic acid component other than ethylene glycol.

As dibasic acid other than terephthalic acid, it is possible to name one kind or the combination of two or more kinds of aromatic dicarboxylic acid such as isophthalic acid, phthalic acid or naphthalene dicarboxylic acid; alicyclic dicarboxylic acid such as cyclohexanedicarboxylic acid; and aliphatic dicarboxylic acid such as succinic acid, adipic acid, sebacic acid or dodecanedioic acid. As diol component other than ethylene glycol, it is possible to name one, two or more kinds selected from a group consisting of propylene glycol, 1,4-butanediol, diethylene glycol, 1,6-hexylene glycol, cyclohexane dimethanol, an ethylene-oxide adduct of bisphenol A and the like.

In the combination of these copolymers, copolymer polyester is required to have a melting point which falls within the above-mentioned range. Further, it is also possible to use the combination of polyfunctional monomers such as trimellitic acid, pyromellitic acid or pentaerythritol.

Polyester used in the present invention is required to have a molecular weight which is sufficient for forming a film. For this end, it is desirable that polyester has intrinsic viscosity (I.V) which falls within a range from 0.55 to 1.9 dl/g, and more particularly, within a range from 0.65 to 1.4 dl/g.

The above-mentioned coating layer made of the thermoplastic resin may contain an inorganic filler (pigment) for the purpose of concealing the metal sheet and facilitating the transmission of wrinkle reducing force to the metal sheet at the time of forming the resin coated metal sheet. Further, in the film, known film blending agents such as anti-blocking agent made of amorphous silica, various charge prevention agents, a lubricant, an oxidation preventing agent, or an ultraviolet-ray absorption agent, for example, can be blended in a known method.

As the inorganic filler, it is possible to use an inorganic white pigment such as rutile-type or anatase-type titanium dioxide, zinc flower or gross white; a leucoplast quality pigment such as barytes, settlable sulfuric acid baryte, calcium carbonate, gypsum, settlable silica, aerosil, talc, baked clay, unbaked clay, barium carbonate, alumina white, synthesis mica, natural mica, synthesis calcium silicate or magnesium carbonate; a black pigment such as carbon black or magnetite; a red pigment such as red iron oxide, and a yellow pigment such as siena, or a blue pigment such as ultramarine or cobalt blue. The inorganic filler can be mixed into the resin at a rate of 10 to 500% by weight with respect to 100% by weight of resin, and more particularly 10 to 300% by weight of inorganic fillers with respect to 100% by weight of resin.

Further, to enhance the adhesiveness of the resin film with the metal sheet, a resin film may be formed of a plurality of layers, wherein a layer of the resin film which is brought into contact with the metal sheet may be formed of a resin having a low melting temperature.

EMBODIMENTS

Hereinafter, the present invention is explained in further detail in conjunction with embodiments.

Embodiment 1

Comparison Examples 1 and 2

[Metal Sheet]
As a metal sheet to which an organic resin is applied by coating, an aluminum alloy sheet (JIS 5052 H19, thickness: 0.3 mm) is used.

[Organic Resin]
As the organic resin to be applied to the metal sheet by coating, the following two-layered resin is used.
Upper layer: (95 mol % of ethylene terephthalate and 5 mol % of ethylene isophthalate, melting temperature: 230° C., IV value: 0.9), thickness of the layer after coating: 5 µm
Lower layer (layer in contact with metal sheet): (85 mol % of ethylene terephthalate and 15 mol % of ethylene isophthalate), melting temperature: 215° C., IV value: 0.7), thickness of the layer after coating: 15 μm The above-mentioned upper layer resin and the lower layer resin are melted by heating and are co-extruded from a T-die such that the upper layer resin is extruded at a temperature of 270° C. and the lower layer resin is extruded at a temperature of 250° C. Thereafter, a center portion and both edge portions of the aluminum alloy sheet are subject to a heating control such that these portions assume following temperatures, and both of the aluminum alloy sheet and the upper and lower organic resins are sandwiched between lamination rolls so as to apply the upper and lower layer resins to the metal sheet under pressure.

In the embodiment 1, the heating temperature of the aluminum alloy sheet is set to 240° C. at the center portion and to 260° C. at both edge portions.

In a comparison example 1, the heating temperature of the aluminum alloy sheet is set to 220° C. at the center portion and to 220° C. at both edge portions (the edge portion being not heated).

In a comparison example 2, the heating temperature of the aluminum alloy sheet is set to 230° C. at the center portion and to 230° C. at both edge portions (the edge portion being not heated).

In the embodiment 1, the temperature of the edge portion of the aluminum alloy sheet is set to 260° C. which is a temperature 30° C. higher than 230° C. which is the higher melting temperature of the organic resin (the melting temperature of the upper layer resin) out of the melting temperatures of two-layered organic resin to be applied by coating. Accordingly the resin portion can be cut by a press.

Further, the temperature of the center portion of the aluminum alloy sheet is set to 240° C. and hence, the aluminum alloy sheet is not softened whereby the aluminum alloy sheet exhibits favorable formability as an organic resin coated metal sheet.

With respect to the comparison examples 1 to 2, the temperature of the edge portion of the aluminum alloy sheet is set to 220° C. which is a temperature lower than 230° C. which is the higher melting temperature of the organic resin (the melting temperature of the upper layer resin) out of the melting temperatures of two-layered organic resin to be applied in layers by coating. Accordingly, the resin film is solidified and hence, even when both of the aluminum alloy sheet and the upper and lower organic resins are sandwiched between the lamination rolls, the resin portion which projects from both edges of the aluminum alloy sheet cannot be cut by a press.

Here, the melting temperature of the resin is determined to be a heating temperature of a metal sheet and the melting temperature of the organic resin is set to the melting temperature measured by a DSC (the abbreviation of Differential Scanning Calorimetry). The melting temperature is measured using a differential scanning calorimetry DSC-7 made by PerkinElmer Inc. as a measuring device. 5 mg of a sample of an organic resin is accurately measured using a semi-micron scale, the temperature of the sample is increased at a temperature elevation speed of 20° C./minute in a nitrogen gas flow, and the melting temperature is obtained from an endothermic peak of the temperature elevation curve.

Embodiment 2

Comparison Examples 3 to 4

[Metal Sheet]
Here, as the metal sheet to which organic resin is applied, an Sn plated steel sheet which is obtained by applying Sn plating having a thickness of 0.3 mm to the a steel sheet at a rate of 3.0 g/m² and, thereafter, applying reflow treatment to the plated metal sheet by coating is used.

[Organic Resin]
As the organic resin to be applied to the metal sheet by coating, the following two-layered resins are used.
Upper layer: (95 mol % of ethylene terephthalate and 5 mol % of ethylene isophthalate, melting temperature: 230° C., IV value: 0.9), thickness of the layer after coating: 5 μm
Lower layer: (85 mol % of ethylene terephthalate and 15 mol % of ethylene isophthalate, melting temperature: 215° C., IV value: 0.7), thickness of the layer after coating: 15 μm The above-mentioned upper layer resin and the lower layer resin are melted by heating and are co-extruded from a T-die such that the upper layer resin is extruded at a temperature of 270° C. and the lower layer resin is extruded at a temperature of 250° C. Thereafter, a center portion and both edge portions of the Sn plated steel sheet are subject to a heating control such that these portions assume following temperatures, and both of the Sn plated steel sheet and the upper and lower organic resins are sandwiched between lamination rolls so as to apply the upper and lower layer resins to the metal sheet by coating under pressure.

In the embodiment 2, the heating temperature of the Sn plated steel sheet is set to 230° C. at the center portion and to 260° C. at both edge portions.

In the comparison example 3, the heating temperature of the Sn plated steel sheet is set to 230° C. at the center portion and to 230° C. at both edge portions (the edge portion being not heated).

In the comparison example 4, the heating temperature of the Sn plated steel sheet is set to 250° C. at the center portion and to 250° C. at both edge portions (the edge portion being not heated).

In the embodiment 2, the temperature of the edge portion of the Sn plated steel sheet is set to 260° C. which is a temperature 30° C. higher than 230° C. which is the higher melting temperature of the organic resin (the melting temperature of the upper layer resin) out of the melting temperatures of the organic two-layered resins to be applied by coating. Accordingly, the resin portion can be cut by a press.

Further, the temperature of the center portion of the Sn plated steel sheet is set to 230° C. and hence, the Sn plated steel sheet is not melted whereby the Sn plated steel sheet exhibits favorable formability as an organic resin coated metal sheet.

With respect to the comparison example 3, the temperature of the edge portion of the Sn plated steel sheet is set to 230° C. which is a temperature equal to 230° C. which is the higher melting temperature of the organic resin (the melting temperature of the upper layer resin) out of the melting temperatures of the organic two-layered resins to be applied by coating. Accordingly, the resin film is solidified and hence, even when both of the Sn plated steel sheet and the upper and lower organic resins are sandwiched between the lamination rolls, the resin portion which projects from both edges of the aluminum alloy sheet cannot be cut sufficiently by a press so that a continuous treatment cannot be performed.

With respect to the comparison example 4, the temperature of the edge portion of the Sn plated steel sheet is set to 250° C. which is a temperature 20° C. higher than 230° C. which is the higher melting temperature of the organic resin (the melting temperature of the upper layer resin) out of the melting temperatures of the organic two-layered resins to be applied by coating. Accordingly, both of the Sn plated steel sheet and the upper and lower organic resins are sandwiched between the lamination rolls and the resin portion which projects from both edges of the Sn plated steel sheet can be cut by a press. However, since the temperature of the center portion of the Sn plated steel sheet is set to 250° C. which is a temperature of Sn to be melted, property of the Sn plated steel sheet as a resin coated metal sheet is largely lowered.

Embodiment 3

Comparison Examples 5 to 6

[Metal Sheet]
As a metal sheet to which an organic resin is applied by coating, an aluminum alloy sheet (JIS 5052 H19, thickness: 0.3 mm) is used.
[Organic Resin]
As the organic resin to be applied to the metal sheet by coating, the following two-layered resins are used.
Upper layer: homogeneous PET (melting temperature: 250° C., IV value: 0.8), thickness of the layer after coating: 5 µm
Lower layer: (85 mol % of ethylene terephthalate and 15 mol % of ethylene isophthalate), melting temperature: 215° C., IV value: 0.7), thickness of the layer after coating: 15 µm The above-mentioned upper layer resin and the lower layer resin are melted by heating and are co-extruded from a T-die such that the upper layer resin is extruded at a temperature of 280° C. and the lower layer resin is extruded at a temperature of 250° C. Thereafter, a center portion and both edge portions of the aluminum alloy sheet are subject to a heating control such that these portions assume following temperatures, and both of the aluminum alloy sheet and the upper and lower organic resins are sandwiched between lamination rolls so as to apply the upper and lower layer resins to the metal sheet by coating by coating under pressure.

In the embodiment 3, the heating temperature of the aluminum alloy sheet is set to 240° C. at the center portion and to 270° C. at both edge portions.

In the comparison example 5, the heating temperature of the aluminum alloy sheet is set to 240° C. at the center portion and to 240° C. at both edge portions (the edge portion being not heated).

In the comparison example 6, the heating temperature of the aluminum alloy sheet is set to 260° C. at the center portion and to 260° C. at both edge portions (the edge portion being not heated).

In the embodiment 3, the temperature of the edge portion of the aluminum alloy sheet is set to 270° C. which is a temperature 20° C. higher than 250° C. which is the higher melting temperature of the organic resin (the melting temperature of the upper layer resin) out of the melting temperatures of the organic two-layered resins to be applied by coating. Accordingly the resin portion can be cut by a press.

Further, the temperature of the center portion of the aluminum alloy sheet is set to 240° C. and hence, the aluminum alloy sheet is not softened whereby the aluminum alloy sheet exhibits favorable formability as an organic resin coated metal sheet.

With respect to the comparison example 5, the temperature of the edge portion of the aluminum alloy sheet is set to 240° C. which is a temperature lower than 250° C. which is the higher melting temperature of the organic resin (the melting temperature of the upper layer resin) out of the melting temperatures of the organic two-layered resins to be applied by coating. Accordingly, the resin film is solidified and hence, even when both of the aluminum alloy sheet and the upper and lower organic resins are sandwiched between the lamination rolls, the resin portion which projects from both edges of the aluminum alloy sheet cannot be cut by a press.

With respect to the comparison example 6, the temperature of the edge portion of the aluminum alloy sheet is set to 260° C. which is a temperature 10° C. higher than 250° C. which is the higher melting temperature of the organic resin (the melting temperature of the upper layer resin) out of the melting temperatures of the organic two-layered resins to be applied by coating. Accordingly, both of the aluminum alloy sheet and the upper and lower organic resins are sandwiched between the lamination rolls and the resin portion which projects from both edges of the aluminum alloy sheet can be cut by a press. However, since the temperature of the center portion of the aluminum alloy sheet is set to 260° C. which is a temperature of the aluminum alloy sheet to be softened, property of the aluminum alloy sheet as a resin coated metal sheet is largely lowered.

Embodiment 4

Comparison Examples 7 to 8

[Metal Sheet]
Here, as the metal sheet to which organic resin is applied by coating, an Sn plated steel sheet which is obtained by applying Sn plating having a thickness of 0.3 mm to the a steel sheet at a rate of 3.0 g/m² and, thereafter, applying reflow treatment to the plated metal sheet is used.
[Organic Resin]
As the organic resin to be applied to the metal sheet by coating, the following single-layered resins are used.
95 mol % of ethylene terephthalate and 5 mol % of ethylene isophthalate, melting temperature: 230° C., IV value: 0.9, thickness of the layer after coating: 20 µm The above-mentioned single-layered resins are melted by heating and are extruded from a T-die at 270° C. and, thereafter, a center portion and both edge portions of the Sn plated steel sheet are subject to a heating control such that these portions assume following temperatures, and both of the Sn plated steel sheet and the single-layered resins are sandwiched between lamination rolls so as to apply the single-layered resins to the Sn plated steel sheet by coating under pressure.

In the embodiment 4, the heating temperature of the Sn plated steel sheet is set to 230° C. at the center portion and to 260° C. at both edge portions.

In a comparison example 7, the heating temperature of the Sn plated steel sheet is set to 230° C. at the center portion and to 230° C. at both edge portions (the edge portion being not heated).

In a comparison example 8, the heating temperature of the Sn plated steel sheet is set to 250° C. at the center portion and to 250° C. at both edge portions (the edge portion being not heated).

In the embodiment 4, the temperature of the edge portion of the Sn plated steel sheet is set to 260° C. which is a temperature 30° C. higher than 230° C. which is the melting temperature of the organic resin to be applied by coating. Accordingly, the resin portion can be cut by a press. Further, the temperature of the center portion of the Sn plated steel sheet is set to 230° C. and hence, the Sn plated steel sheet is not melted whereby the Sn plated steel sheet exhibits favorable formability as an organic resin coated metal sheet.

With respect to the comparison example 7, the temperature of the edge portion of the Sn plated steel sheet is set to 230° C. which is a temperature equal to 230° C. which is the melting temperature of the organic resin to be applied by coating. Accordingly, the resin film is solidified and hence, even when both of the Sn plated steel sheet and the single-layered resins are sandwiched between the lamination rolls, the resin portion which projects from both edges of the Sn plated steel sheet cannot be cut sufficiently by a press so that a continuous treatment cannot be performed.

With respect to the comparison example 8, the temperature of the edge portion of the Sn plated steel sheet is set to 250° C. which is a temperature 20° C. higher than 230° C. which is the melting temperature of the organic resin to be applied in layers by coating. Accordingly, the resin portion which projects from both edges of the Sn plated steel sheet can be cut by a press. However, since the temperature of the center portion of the Sn plated steel sheet is set to 250° C. which is a temperature of Sn to be melted, property of the Sn plated steel sheet as a resin coated metal sheet is largely lowered.

Here, the acceptance or the rejection of property of the resin coated metal sheet based on the presence or non-presence of abnormality in temperature of the center portion of the metal sheet such as an aluminum alloy plate or a tin plate is determined by detecting a surface state (color, unevenness or the like) of the resin coated metal sheet using a CCD camera, a shape inspection device which uses laser beams or ultrasonic waves or the like.

INDUSTRIAL APPLICABILITY

The present invention heats only both edge portions of the metal sheet to the high temperature equal to or more than the melting temperature of the resin and hence, it is possible to stably and easily remove the resin portions which project from both edge portions of the metal sheet while preventing the degradation of the resin other than both edge portions. Further, the edge portions of the metal sheet which is heated to the high temperature are locally heated and hence, only such heated portions can be removed by trimming later whereby it is possible to manufacture the organic resin coated metal sheet which exhibits stable property in the widthwise direction thus enhancing the industrial applicability.

EXPLANATION OF SYMBOLS

Figure 1:
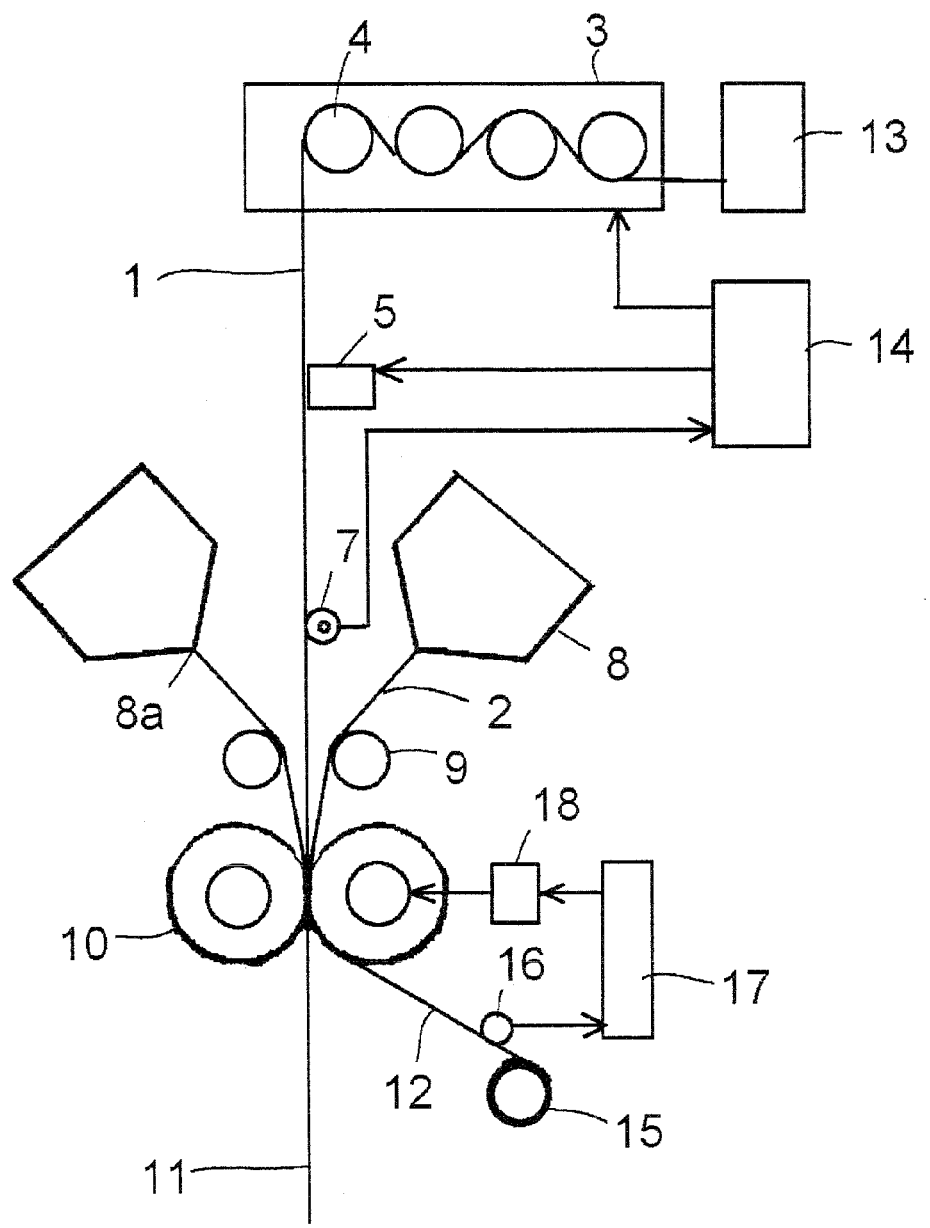
FIG. 1 is a schematic side view for explaining a manufacturing method of an organic resin coated metal sheet according to an embodiment of the present invention.
Figure 2:
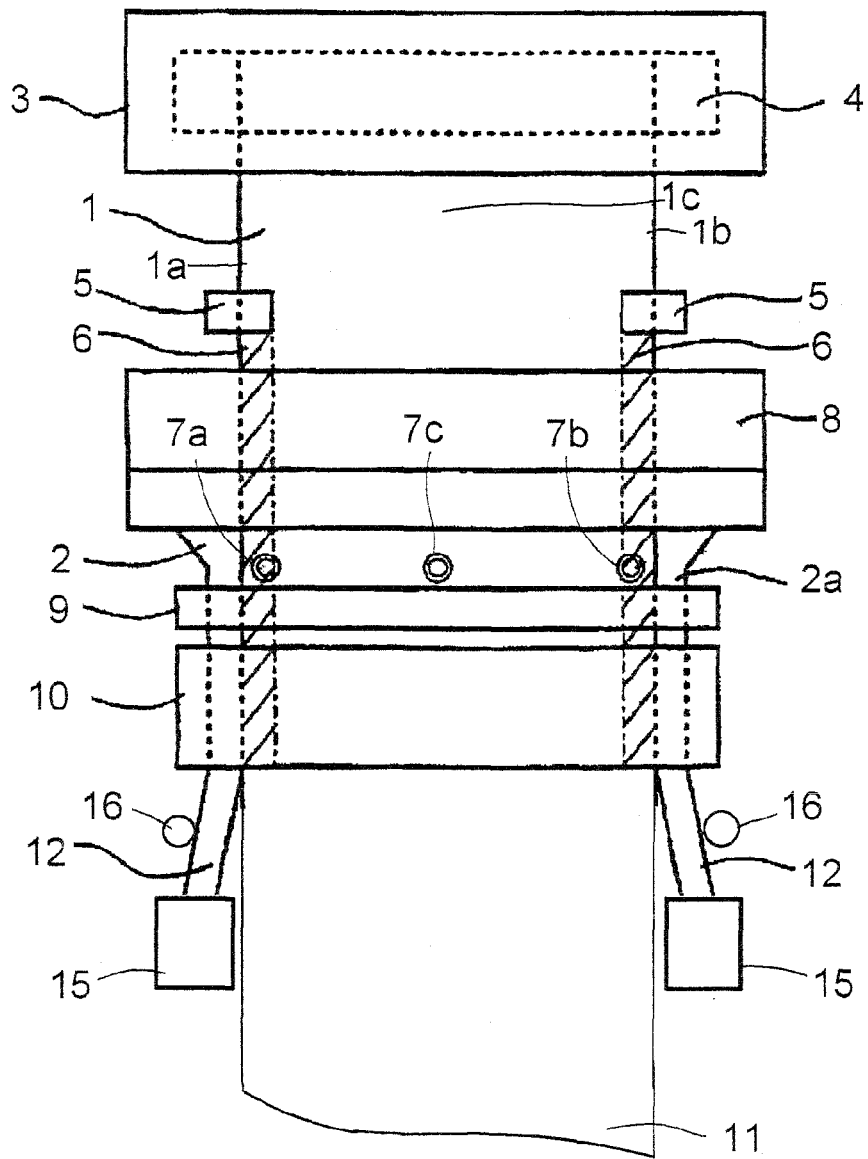
FIG. 2 is a schematic front view for explaining a manufacturing method of the organic resin coated metal sheet according to the embodiment of the present invention.

1: metal sheet
1a, 1b: both edge portion
1c: center portion
2: resin film
2a: resin portion
3: metal sheet center portion heating means
4: jacket roll
5 (5a, 5b): metal sheet edge portion heating means
6: heating region
7 (7a, 7b, 7c): metal sheet temperature measuring means
8: T-die
8a: die lip
9: pre-roll
10: lamination roll
11: resin coated metal sheet
12: removed resin portion
13: metal sheet supply means
14: heating temperature control means
15: removal means
16: monitor sensor
17: lamination roll pressing force control device
18: lamination roll press device

The invention claimed is:
1. A manufacturing method of an organic-resin coated metal sheet by directly extruding an organic resin melted by heating from a die lip of a T-die in a film shape onto a metal sheet thus applying an organic resin film to the metal sheet by coating, the manufacturing method comprising the steps of:
continuously feeding a long strip metal sheet using a metal-sheet supply means;
measuring temperatures of edge portions of the metal sheet and a temperature of an approximately central portion of the metal sheet using a metal-sheet temperature measuring means arranged directly upstream of lamination rolls;
inputting temperature values respectively measured by the metal-sheet temperature measuring means to a heating temperature control means;
feeding an output value calculated by the heating temperature control means to a metal sheet center portion heater arranged directly upstream of the T-die;
heating a widthwise approximately center portion of the metal sheet to a first temperature by the metal sheet center portion heating means based on the output value;
feeding the output value calculated by the heating temperature control means to a metal sheet edge portion heating means arranged directly upstream of the T-die;
heating widthwise edge portions of the metal sheet to a second temperature higher than the first temperature by the metal sheet edge portion heating means based on the output value;
applying a resin film extruded from the T-die such that the resin film projects from both widthwise edge portions of the metal sheet by sandwiching and pressure-bonding the metal sheet and the resin film between a pair of lamination rolls; and
removing resin portions in a semi-molten state and projecting from both edge portions of the metal sheet by press cutting.

2. A manufacturing method of an organic-resin coated metal sheet according to claim 1, wherein the second temperature for heating both widthwise edge portions of the metal sheet falls within a temperature range of a highest melting temperature of the organic resin to be coated +(10 to 50° C.).

3. A manufacturing method of an organic-resin coated metal sheet according to claim 1, wherein the heating temperature control means
compares the first temperature and the second temperature inputted to the heating temperature control means,
determines whether or not the second temperature is equal to or higher than the first temperature, and
determines whether or not the inputted second temperature falls within a temperature range of a melting temperature of the resin inputted to the heating temperature control means +(10 to 50° C.).

4. A manufacturing method of an organic-resin coated metal sheet according to claim 1, wherein
a monitor sensor for monitoring whether or not the resin portions to be removed are removed by press cutting is arranged directly downstream of the lamination rolls,
the monitor sensor transmits a signal to a lamination roll pressing force control device when the monitor sensor cannot detect the removed resin portion and allows the lamination roll pressing force control device to determine that the resin portion is not cut by a press, the lamination roll pressing force control device transmits a signal for increasing a pressing force of the lamination roll to a lamination roll press device, and the lamination roll press device presses either one or both of right and left end portions of one of the lamination rolls in the lamination direction.

5. A manufacturing apparatus of an organic-resin coated metal sheet by directly extruding an organic resin melted by heating from a die lip of a T-die in a film shape onto a metal sheet thus applying an organic resin film to the metal sheet by coating, the manufacturing apparatus comprising:

a metal sheet supply means which continuously feeds a long strip metal sheet;

a metal sheet temperature measuring means which is arranged directly upstream of lamination rolls and measures temperatures of edge portions of the metal sheet and a temperature of an approximately central portion of the metal sheet;

a heating temperature control means which receives inputting of temperature values measured by the metal-sheet temperature measuring means, calculates heating temperatures for heating the edge portions of the metal sheet and the approximately central portion of the metal sheet, and outputs a result value of the heating temperatures;

a metal sheet center portion heater which is arranged directly upstream of the T-die and heats a widthwise approximately center portion of the metal sheet to a first temperature based on the output value from the heating temperature control means;

a metal sheet edge portion heating means which is arranged directly upstream of the T-die and heats both widthwise edge portions of the metal sheet to a second temperature higher than the first temperature based on the output value from the heating temperature control means;

a pair of lamination rolls which applies a resin film extruded from the T-die by sandwiching and pressure-bonding the metal sheet and the resin film therebetween and press-cuts resin portions in a semi-molten state and projecting from both edge portions of the metal sheet; and a removal means which removes the press-cut resin portions.

6. A manufacturing apparatus of an organic-resin coated metal sheet according to claim 5, wherein a monitor sensor for monitoring whether or not the resin portions to be removed are removed by press cutting is arranged directly downstream of the lamination rolls wherein, the monitor sensor transmits a signal to a lamination roll pressing force control device when the monitor sensor cannot detect the removed resin portion wherein, the lamination roll pressing force control device transmits a signal for increasing a pressing force of the lamination roll to a lamination roll press device, and wherein the lamination roll press device presses either one or both of right and left end portions of one of the lamination rolls in the lamination direction.

* * * * *